UNITED STATES PATENT OFFICE 2,586,370

N - DIMETHYLAMINOETHYL-9- METHYL-ACRIDAN AND ACID ADDITION SALTS THEREOF

Jack Mills, Indianapolis, Ind., assignor to Eli Lilly and Company, Indianapolis, Ind., a corporation of Indiana No Drawing. Application May 15, 1950, Serial No. 162,145

4 Claims. (Cl. 260—279)

This invention relates to N-dimethylaminoethyl-9-methylacridan and its acid addition salts.

N-dimethylaminoethyl-9-methylacridan may be represented by the following formula

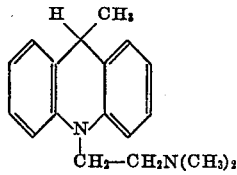

N-dimethylaminoethyl-9-methylacridan is a yellowish, waxy solid at ordinary temperatures. Because of the presence of the basic side chain, it forms salts with acids. Salts formed from the common mineral acids are in general water-soluble. Salts formed from organic acids, especially acids of higher molecular weight, exhibit a degree of oil solubility. N-dimethylaminoethyl-9-methylacridan and its acid addition salts have been found to be useful as antihistaminic agents and are characterized by a high degree of activity and prolonged effectiveness.

N-dimethylaminoethyl-9-methylacridan is prepared by reacting an alkali-metal salt of 9-methylacridan with a dimethylaminoethyl halide in a suitable solvent. Conveniently, the alkali-metal salt of the 9-methylacridan is prepared by treating the acridine with a suspension of an alkali-metal amide, for example, sodamide, potassamide or lithium amide, in a solvent which dissolves the 9-methylacridan. The acridan salt is not isolated, but while in the reaction mixture is treated directly with a solution of a dimethylaminoethyl halide, for example, dimethylaminoethyl chloride or bromide. The solvent used can be any inert solvent in which the reactants are appreciably soluble. Illustrative examples of suitable solvents include toluene, xylene, benzene and the like.

N-dimethylaminoethyl-9-methylacridan base is readily isolated from the reaction mixture and purified by methods known to the art. For example, isolation is accomplished by adding water to the reaction mixture and extracting the mixture with a water-immiscible solvent, evaporating the solvent, and recrystallizing the residue, or preferably, by converting the base to an acid addition salt, purifying the salt, and recovering the base from the salt.

Acid addition salts of the acridine base are prepared by the methods commonly used to prepare acid addition salts of nitrogenous organic bases. Preferably, the salts are prepared with the avoidance of exposure to air in so far as possible. For example, the base is dissolved in a solvent containing the theoretically required amount of the desired acid, and the solution is evaporated to yield the salt, or alternatively, the salt is precipitated by adding to the solution a solvent in which the salt is insoluble.

This is a continuation-in-part of my United States application Serial No. 9,317, filed February 18, 1948, now abandoned.

The following examples more specifically illustrate the preparation of the novel compounds of this invention.

EXAMPLE 1

*Preparation of N-dimethylaminoethyl-9-methylacridan hydrochloride*

To a solution of 20 g. of 9-methylacridine (prepared according to the method of Hamer, J. Chem. Soc. 133, 995, 1930) in 1 liter of absolute ethanol, are added 5 g. of 5 percent palladium-carbon catalyst. The mixture is subjected to the action of hydrogen at 60 lbs. pressure and a temperature of about 50° C. until the absorption of hydrogen has ceased. The catalyst is filtered off, the filtrate is evaporated to dryness, and the residue, comprising crude 9-methylacridan is washed with low-boiling petroleum ether to remove yellow colored impurities. 9-methylacridan thus prepared melts at about 126° C.

15 g. of 9-methylacridan are added to a suspension of 2.3 g. of lithium amide in 100 cc. of xylene. The mixture is refluxed for about 12 hours, is cooled to about 50° C., and 15 g. of dimethylaminoethyl chloride dissolved in 50 cc. of ether are added. The mixture is heated to about 80° C. for 12 hours and is then refluxed for about 1 hour. The reaction mixture is poured into an equal volume of water and 100 cc. of ether are added. The ethereal layer containing the N-dimethylaminoethyl-9-methylacridan is separated, dried and evaporated to dryness in vacuo. The residue is taken up in 100 cc. of anhydrous ether and dry hydrogen chloride is bubbled through the cooled solution, whereupon a copious crystalline precipitate of N - dimethylaminoethyl-9-methylacridan hydrochloride forms. This is filtered off and is purified by recrystallizing it from an alcohol solution by the addition of ether.

N-dimethylaminoethyl - 9 - methylacridan hydrochloride melts at about 209° C.

EXAMPLE 2

*Preparation of N-dimethylaminoethyl-9-methylacridan*

10 g. of N-dimethylaminoethyl-9-methylacridan hydrochloride are dissolved in a minimum amount of water and the solution is made basic with sodium hydride solution. The oily N-dimethylaminoethyl-9-methylacridan which separates is taken up in ether and the ether evaporated. The residue of N-dimethylaminoethyl-9-methylacridan is purified by recrystallizing it in the cold from a mixture of benzene and petroleum ether.

EXAMPLE 3

From N-dimethylaminoethyl-9-methylacridan base obtained by the procedure of Example 2, acid addition salts are prepared by reacting equivalent amounts of the base and the desired acid in alcoholic solution to dryness. In this manner are prepared the hydrobromide, phosphate, sulfate, and nitrate salts of N-dimethylaminoethyl-9-methylacridan.

I claim:

1. A member of the group consisting of N-dimethylaminoethyl-9-methylacridan and its acid addition salts.
2. N-dimethylaminoethyl-9-methylacridan.
3. Acid addition salts of N-dimethylaminoethyl-9-methylacridan.
4. N-dimethylaminoethyl-9-methylacridan hydrochloride.

JACK MILLS.

REFERENCES CITED

The following references are of record in the file of this patent:

UNITED STATES PATENTS

| Number | Name | Date |
|---|---|---|
| 2,528,162 | Mills | Oct. 31, 1950 |